United States Patent
Zhou et al.

(10) Patent No.: US 9,521,661 B1
(45) Date of Patent: Dec. 13, 2016

(54) METHOD OF SCHEDULING COMMUNICATION IN A WIRELESS COMMUNICATION NETWORK

(71) Applicant: Sprint Spectrum LP, Overland Park, KS (US)

(72) Inventors: Yu Zhou, Herndon, VA (US); Chunmei Liu, Great Falls, VA (US); Muhammad Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 279 days.

(21) Appl. No.: 14/209,763

(22) Filed: Mar. 13, 2014

(51) Int. Cl.
*H04W 72/04* (2009.01)
*H04W 24/00* (2009.01)

(52) U.S. Cl.
CPC ......... *H04W 72/0413* (2013.01); *H04W 24/00* (2013.01)

(58) Field of Classification Search
CPC ..... H04L 12/189; H04W 16/32; H04W 72/04; H04W 72/0406
See application file for complete search history.

(56) References Cited

U.S. PATENT DOCUMENTS

| | | | |
|---|---|---|---|
| 2012/0270594 A1 | 10/2012 | Parkvall et al. | |
| 2013/0084910 A1* | 4/2013 | Suzuki | H04W 24/02 455/515 |
| 2013/0107705 A1* | 5/2013 | Dinan | H04W 72/0446 370/230 |
| 2013/0107826 A1* | 5/2013 | Dinan | H04W 72/0446 370/329 |
| 2013/0194982 A1 | 8/2013 | Fwu et al. | |

* cited by examiner

*Primary Examiner* — David Oveissi

(57) ABSTRACT

A system and method of scheduling communication in a wireless communication network are provided. A first access node can determine a scheduling scheme based on data addressed to wireless devices in communication with the first, second, and third access nodes. The data addressed to the wireless devices in communication with the first access node can be transmitted during a first subframe of the scheduling scheme where the first access node does not transmit data addressed to the wireless devices in communication with the first access node during a second subframe of the scheduling scheme. The second and third access nodes can be instructed to assign data addressed to wireless devices that do not meet a signal condition threshold to be transmitted during the first subframe and to assign data addressed to wireless devices that meet the signal condition threshold to be transmitted during the second subframe.

14 Claims, 6 Drawing Sheets ively reduction in coverage and throughput to the wireless devices in communication with the short range access node. A scheduling scheme comprising almost blank subframes (ABS) can be used to create an opportunity for the wireless devices within the cell edge region of a short range access node to receive downlink information without interference from the macro access node.
METHOD OF SCHEDULING COMMUNICATION IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of network configurations can be used to communicate data over the wireless network. For example, a heterogeneous network can be configured to include various types of access nodes such as a macro access node, a micro access node, a pico access node, a femto access node, etc. In a heterogeneous network, a wireless device can be served by an access node having the lowest signal path loss rather than by an access node having the strongest signal strength as in traditional network configurations.

In a heterogeneous network, interference can occur at the cell edge of the short range, low power access nodes due to the macro access node. This interference can result in undesirable reduction in coverage and throughput to the wireless devices in communication with the short range access node. A scheduling scheme comprising almost blank subframes (ABS) can be used to create an opportunity for the wireless devices within the cell edge region of a short range access node to receive downlink information without interference from the macro access node.

OVERVIEW

A system and method of scheduling communication in a wireless communication network are provided. A first access node can determine a scheduling scheme based on data addressed to wireless devices in communication with the first access node, data addressed to wireless devices in communication with a second access node, and data addressed to wireless devices in communication with a third access node. The scheduling scheme can comprise a first subframe and a second subframe. The scheduling scheme can be communicated from the first access node to the second access node and the third access node. The data addressed to the wireless devices in communication with the first access node can be transmitted during the first subframe of the scheduling scheme where the first access node does not transmit data addressed to the wireless devices in communication with the first access node during the second subframe of the scheduling scheme. The second access node can be instructed to assign data addressed to wireless devices in communication with the second access node that do not meet a signal condition threshold to be transmitted during the first subframe of the scheduling scheme. The second access node can also be instructed to assign data addressed to wireless devices in communication with the second access node that meet the signal condition threshold to be transmitted during the second subframe of the scheduling scheme. The third access node can be instructed to assign data addressed to wireless devices in communication with the third access node that do not meet the signal condition threshold to be transmitted during the first subframe of the scheduling scheme. The third access node can also be instructed to assign data addressed to wireless devices in communication with the third access node that meet the signal condition threshold to be transmitted during the second subframe of the scheduling scheme.

DETAILED DESCRIPTION

Figure 1:
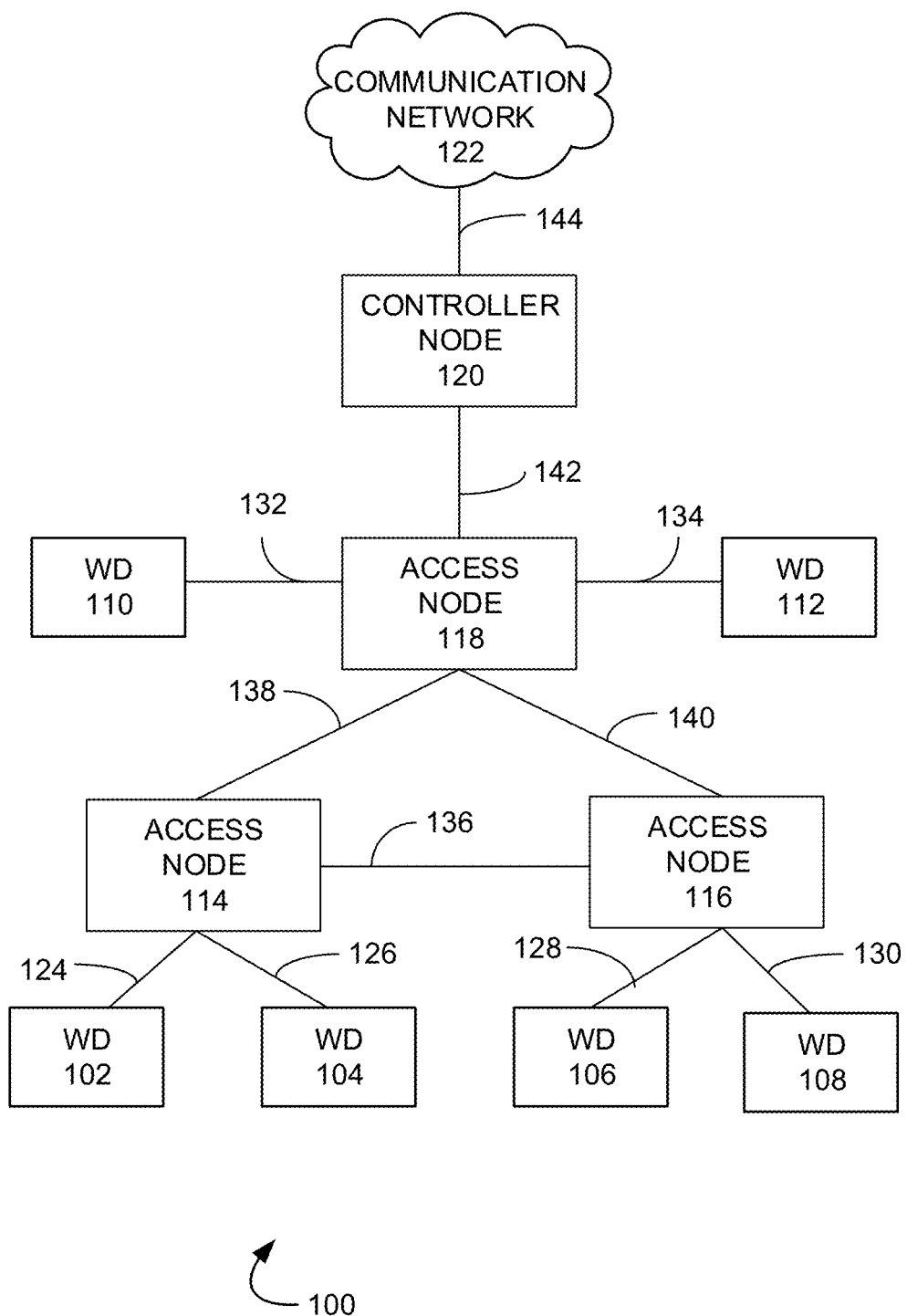
FIG. 1 illustrates a communication system to schedule communications in a wireless communication network.

FIG. 1 illustrates an exemplary communication system 100 for scheduling communication in a wireless communication network. Communication system 100 can comprise wireless devices 102, 104, 106, 108, 110, 112, access nodes 114, 116, 118, controller node 120 and a communication network 122. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 114, 116, 118 and communication network 122, which are omitted for clarity, including additional processing nodes, routers, gateways, and physical and/or wireless data links for carrying data among the various network elements.

Wireless devices 102, 104, 106, 108, 110, 112 can be any device configured to communicate over communication system 100 using a wireless interface. For example, wireless devices 102, 104, 106, 108, 110, 112 can include a remote terminal unit, a cell phone, a smart phone, a computing platform such as a laptop, palmtop, or a tablet, a personal digital assistant, or an internet access device, and combinations thereof. It is noted that while FIG. 1 illustrates two wireless devices in communication with each access node 114, 116, 118, any number of wireless devices can be implemented according to various exemplary embodiments disclosed herein.

The wireless interface of wireless devices 102, 104, 106, 108, 110, 112 can include one or more transceivers for transmitting and receiving data over communication system 100. Each transceiver can be associated with the same or different frequency bands, the same or different radio access technologies, the same or different network providers, and/or the same or different services. For example, wireless devices 102, 104, 106, 108, 110, 112 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 114 through communication link 124. Wireless device 104 can be in communication with access node 114 through communication link 126. Wireless device 106 can be in communication with access node 116 through communication link 128. Wireless device 108 can be in communication with access node 116 through communication link 130. Wireless device 110 can be in communication with access node 118 through communication link 132. Wireless device 112 can be in communication with access node 118 through communication link 134. Links 124, 126, 128, 130, 132, 134 can use various communication media, such as air, space, metal, optical fiber, or some other signal propagation path—including combinations thereof. Communication links 124, 126, 128, 130, 132, 134 may comprise many different signals sharing the same link. Communication links 124, 126, 128, 130, 132, 134 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 114 could share the same representative wireless link, but be transferred over different communication sessions, frequencies, timeslots, packets, ports, sockets, logical transport links, or in different directions—including combinations thereof.

Wireless devices 102, 104, 106, 108, 110, 112 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 114, 116, 118 can be any network node configured to provide communication between wireless devices 102, 104, 106, 108, 110, 112 and communication network 122. Access nodes 114, 116, 118 can be standard access nodes or short range, low power access nodes. In an exemplary embodiment, access nodes 114, 116 can be short range, low power access nodes within at least a portion of an overlapping coverage area of access node 118, where access node 118 can be a standard access node. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while three access nodes 114, 116, 118 are illustrated in FIG. 1, any number of access nodes can be implemented within system 100.

Access nodes 114, 116, 118 can comprise a processor and associated circuitry to execute or direct the execution of computer-readable instructions to obtain information. Access nodes 114, 116, 118 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 114, 116, 118 can receive instructions and other input at a user interface.

Controller node 120 can be any network node configured to communicate information and/or control information over system 100. For ease of illustration, controller node 120 is shown in FIG. 1 to be in communication with access node 118 through communication link 142. However, one of ordinary skill in the art would recognize that controller node 120 can also be in communication with access nodes 114 and/or 116. Controller node 120 can be a standalone computing device, computing system, or network component, and can be accessible, for example, by a wired or wireless connection, or through an indirect connection such as through a computer network or communication network. For example, controller node 120 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 120 is not limited to any specific technology architecture, such as Long Term Evolution (LTE) and can be used with any network architecture and/or protocol.

Controller node 120 can comprise a processor and associated circuitry to execute or direct the execution of computer-readable instructions to obtain information. Controller node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 120 can receive instructions and other input at a user interface.

Access node 114 can be in communication with access node 116 through communication link 136. Access node 114 can be in communication with access node 118 through communication link 138. Access node 116 can be in communication with access node 118 through communication link 140. Access node 118 can be in communication with controller node 120 through communication link 142. Controller node 120 can be in communication with communication network 122 through communication link 144. Communication links 136, 138, 140, 142, 144 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 136, 138, 140, 142, 144 can be a direct link or might include various equipment, intermediate components, systems, and networks.

Communication network 122 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 122 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 122 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 122 can also comprise additional base stations, controller nodes, telephony switches, internet routers, network gateways, computer systems, communication links, or some other type of communication equipment, and combinations thereof.

In operation, a first access node, such as access node 118 can determine a scheduling scheme based on data addressed to wireless devices 110, 112, data addressed to wireless devices 102, 104, and data addressed to wireless devices 106, 108. The scheduling scheme can comprise a first subframe and a second subframe. Access node 118 can communicate the scheduling scheme to access nodes 114, 116. Data addressed to wireless devices 110, 112 can be transmitted from access node 118 during the first subframe of the scheduling scheme. In addition, access node 118 does not transmit data addressed to wireless devices 110, 112 during the second subframe of the scheduling scheme. Access node 114 can be instructed to assign data addressed to wireless devices 102, 104 that do not meet a signal condition threshold to be transmitted during the first subframe of the scheduling scheme and to assign data addressed to wireless devices 102, 104 that meet the signal condition threshold to be transmitted during the second subframe of the scheduling scheme. Access node 116 can be instructed to assign data addressed to wireless devices 106, 108 that do not meet the signal condition threshold to be transmitted during the first subframe of the scheduling scheme and to assign data addressed to wireless devices 106, 108 that meet the signal condition threshold to be transmitted during the second subframe of the scheduling scheme.

In an exemplary embodiment, by utilizing the same scheduling scheme in the second access node and the third access node, the second subframes in the second access node and the second subframes in the third access node can be synchronized, such that the unnecessary ABS due to the second subframes can be reduced, which increases the capacity of the first access node and first subframes of the scheduling scheme.

The scheduling scheme can comprise 0-N first subframes and 0-N second subframes provided that the combination of number of subframes equals N. For example, in LTE N equals ten subframes per frame. The scheduling scheme of one frame can be determined to comprise a combination of 0-10 first subframes and 0-10 second subframes. In an exemplary embodiment, when no wireless device within the cell edge region requires resources to transmit uplink data, the number of second subframes can be selected to be 0 and the frame can be configured to include 10 first subframes.

By utilizing the same scheduling scheme at the second access node and the third access node, the second subframes associated with the second access node and the second subframes associated with the third access node can be synchronized and a number of ABS within each frame can be determined to maximize the capacity of the first access node.

Figure 2:
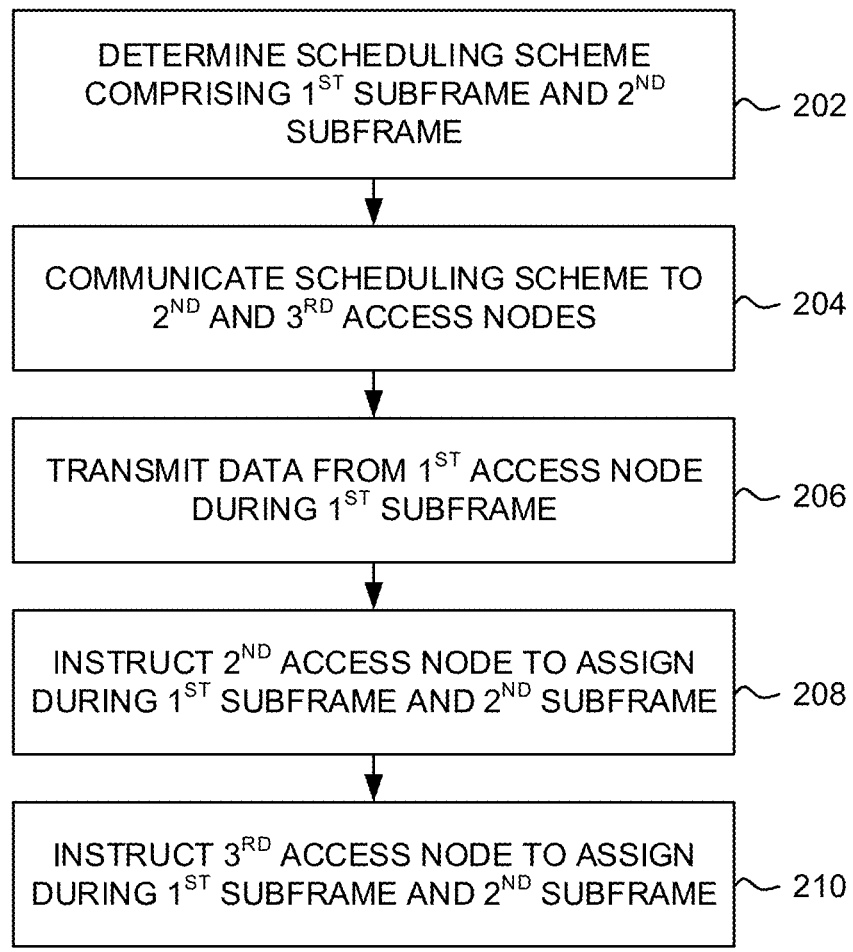
FIG. 2 illustrates an exemplary method of scheduling communication in a wireless communication network.

FIG. 2 illustrates a flow chart of an exemplary method of scheduling communication in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a network node can determine a scheduling scheme comprising a first subframe and a second subframe. For example, access node 118 and/or controller node 112 can determine the scheduling scheme. A scheduling scheme can be any scheme associated with scheduling resources for an access node to be in communication with a wireless device. A scheduling scheme can comprise a plurality of frames and each frame can comprise a plurality of subframes where the plurality of subframes comprises at least one first subframe and at least one second subframe. The number of first subframes and second subframes determined within the scheduling scheme can be based on various factors such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul of system 100, a throughput of each network node, a processing load at each network node, and any delay associated with each network node.

In an exemplary embodiment, the scheduling scheme can be further determined based on a signal condition of wireless devices in communication with access nodes 114, 116, 118. For example, wireless devices in communication with access nodes 114, 116 can experience interference from access node 118 if they are located in the cell edge of access nodes 114, 116. Therefore, a signal condition of the wireless devices in communication with access nodes 114, 116, 118 can be determined prior to determining the scheduling scheme. The signal condition can be indicative of a signal quality and/or signal strength and be based on a signal characteristic. For example, the signal condition can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR).

After the signal characteristic associated with each wireless device is classified as meeting the signal condition (e.g. the wireless device is located at the cell edge of the associated access node) and not meeting the signal condition (e.g. the wireless device is not located at the cell edge of the associated access node), the network node can determine the scheduling scheme. In an exemplary embodiment, when data addressed to a wireless device, such as wireless device 102, 104, 106, 108, exceeds a threshold amount and the wireless device is determined to be located at the cell edge of the associated access node, the scheduling scheme associated with access node 118 can comprise a greater number of almost blank subframes.

The scheduling scheme can be communicated to a second and third access node at 204. For example, after controller node 120 and/or access node 118 determines the scheduling scheme for access nodes 118, 114, 116 to communicate with wireless devices 110, 112, 102, 104, 106, 108, respectively, the scheduling scheme is communicated to access nodes 114, 116.

At 206, data can be transmitted from a first access node to wireless devices in communication with the first access node during the first subframe of the scheduling scheme. In addition, data can be prevented from being transmitted from the first access node during the second subframe of the scheduling scheme. For example, access node 118 can transmit data addressed to wireless devices 110, 112 during the first subframe of the scheduling scheme and not transmit data addressed to wireless devices 110, 112 during the second subframe of the scheduling scheme.

The second access node can be instructed to assign data addressed to wireless devices in communication with the second access node that do not meet a signal condition threshold to be transmitted during the first subframe and to assign data addressed to wireless devices that meet the signal condition threshold to be transmitted during the second subframe of the scheduling scheme at 208. For example, access node 118 and/or controller node 120 can instruct access node 114 to transmit data addressed to wireless devices at the cell edge during the second subframe (e.g. when access node 118 is not transmitting data to wireless devices 110, 112) and to transmit data addressed to wireless devices not at the cell edge during the first subframe of the scheduling scheme.

At 210, the third access node can be instructed to assign data addressed to wireless devices in communication with the third access node that do not meet the signal condition threshold to be transmitted during the first subframe and to assign data addressed to wireless devices that meet the signal condition threshold to be transmitted during the second subframe of the scheduling scheme. For example, access node 118 and/or controller node 120 can instruct access node 116 to transmit data addressed to wireless devices at the cell edge during the second subframe and to transmit data addressed to wireless devices not at the cell edge during the first subframe of the scheduling scheme.

Figure 3:
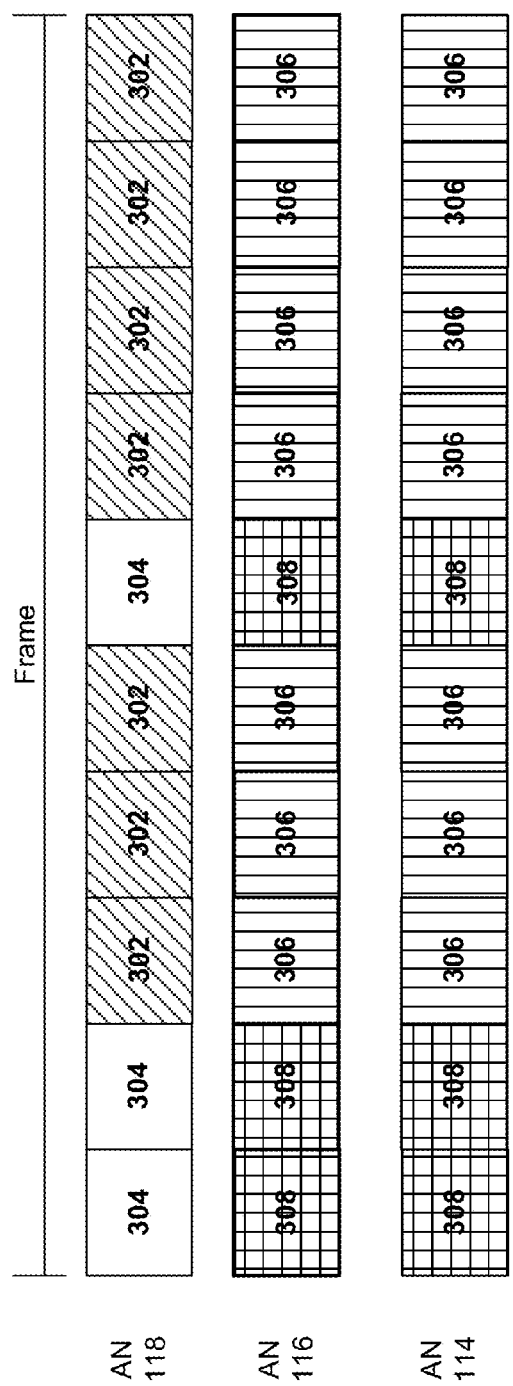
FIG. 3 illustrates an exemplary scheduling scheme for scheduling communication in a wireless communication network.

FIG. 3 illustrates an exemplary scheduling scheme for scheduling communication in a network. The scheduling scheme can comprise a frame having a plurality of subframes. The pattern of the subframes can be based on various factors including the amount of information to be sent in the downlink to wireless devices in communication with each access node, a load on each access node, a load on the network, an application requirement of an application running on a wireless device in communication with an access node, etc. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul, a throughput of each network node, a processing load at each network node, and any delay associated with each network node. For example, the scheduling scheme associated with access node 118 can comprise subframes 302 in which access node 118 can transmit downlink data to wireless devices 110, 112 and almost blank subframes 304 in which access node 118 does not transmit downlink data to wireless devices 110, 112. During the almost blank subframes 304, access nodes 114, 116 can transmit downlink data to wireless devices that meet the signal condition threshold (e.g. the wireless devices are located in cell edge of the associated access node) during subframes 308. In addition, access nodes 114, 116 can transmit downlink data to wireless devices that do not meet the signal condition threshold (e.g. the wireless devices are not located in the cell edge of the associated access node) during subframes 306.

It is noted that while three almost blank subframes 304 are illustrated in FIG. 3, any number of almost blank subframes 304 can be included in the scheduling scheme. For example, when the amount of data addressed to wireless devices 110, 112 exceeds a threshold and the amount of data addressed to wireless devices in the cell edge of access nodes 114, 116 is below a threshold, the number of almost blank subframes 304 can be reduced. When the amount of data addressed to wireless devices in the cell edge of access nodes 114, 116 is greater than a threshold and/or the amount of data addressed to wireless devices 110, 112 is below a threshold, the number of almost blank subframes 304 can be increased.

Figure 4:
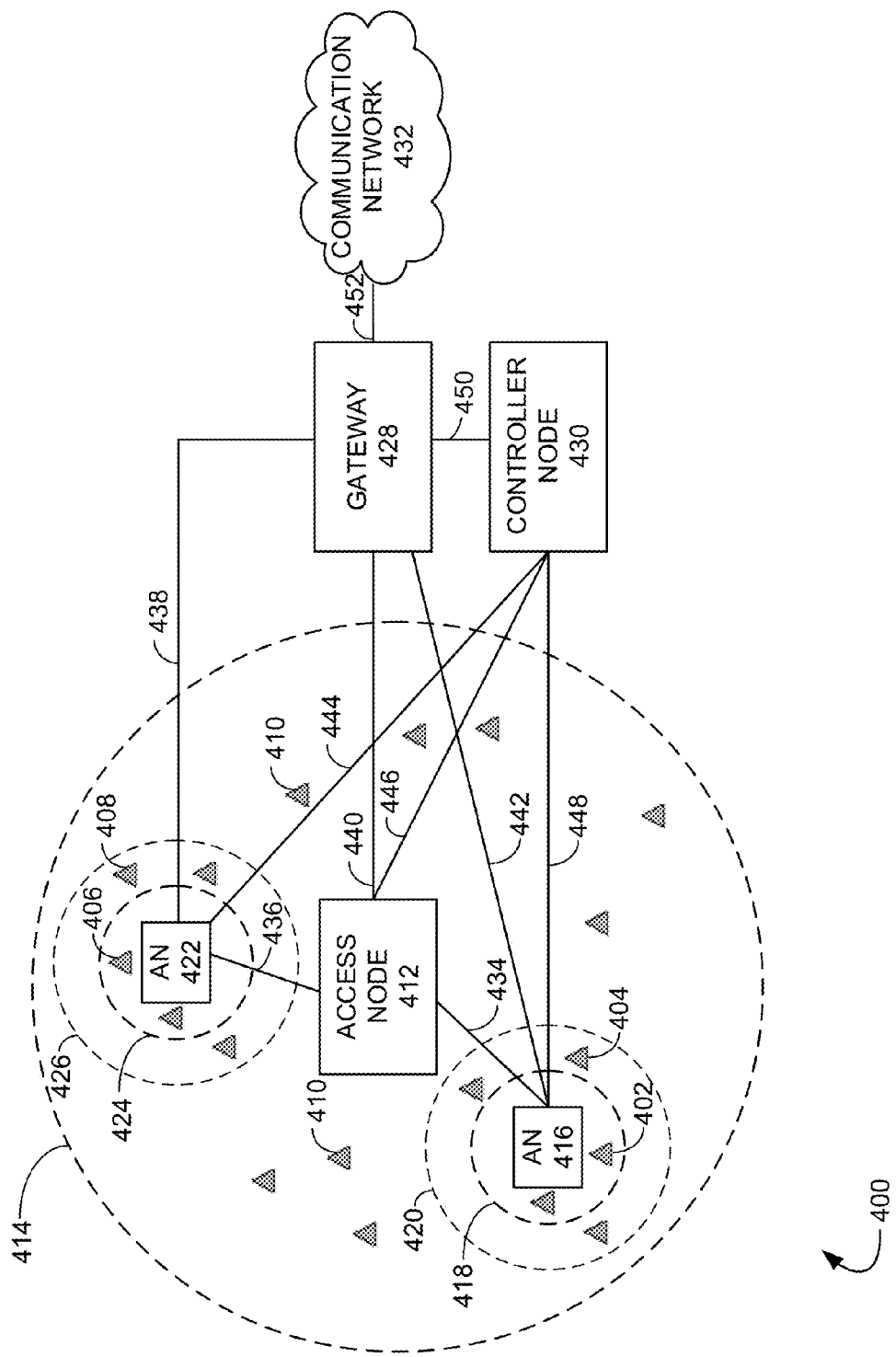
FIG. 4 illustrates another communication system to schedule communications in a wireless communication network.

FIG. 4 illustrates an exemplary communication system 400 for scheduling communication in a wireless communication network. Communication system 400 can comprise wireless devices 402, 404, 406, 408, 410, access nodes 412, 416, 422, gateway 428, controller node 430, and communication network 432. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 412, 416, 422 and communication network 432, which are omitted for clarity, including additional processing nodes, routers, gateways, and physical and/or wireless data links for carrying data among the various network elements.

Wireless devices 402, 404, 406, 408, 410 can be any device configured to communicate over communication system 400 using a wireless interface. For example, wireless devices 402, 404, 406, 408, 410 can include a remote terminal unit, a cell phone, a smart phone, a computing platform such as a laptop, palmtop, or a tablet, a personal digital assistant, or an internet access device, and combinations thereof.

The wireless interface of wireless devices 402, 404, 406, 408, 410 can include one or more transceivers for transmitting and receiving data over communication system 400. Each transceiver can be associated with the same or different frequency bands, the same or different radio access technologies, the same or different network providers, and/or the same or different services. For example, wireless devices 402, 404, 406, 408, 410 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

While not illustrated in FIG. 4 for clarity, wireless devices 402, 404 can be in communication with access node 416 through communication links. Wireless devices 406, 408 can be in communication with access node 422 through communication links. Wireless devices 410 can be in communication with access node 412 through communication links. The communication links can use various communication media, such as air, space, metal, optical fiber, or some other signal propagation path—including combinations thereof. The communication links may comprise many different signals sharing the same link. The communication links could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 402 and access node 416 could share the same representative wireless link, but be transferred over different communication sessions, frequencies, timeslots, packets, ports, sockets, logical transport links, or in different directions—including combinations thereof.

Wireless devices 402, 404, 406, 408, 410 can transmit and/or receive information over system 400 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 412, 416, 422 can be any network node configured to provide communication between wireless devices 402, 404, 406, 408, 410 and communication network 432. Access nodes 412, 416, 422 can be standard access nodes or short range, low power access nodes. In an exemplary embodiment, access node 412 can be a standard access node having a coverage area 414. Access node 416 can be short range, low power access node having a coverage area of 420 and access node 422 can be a short range, low power access node having a coverage area of 426. Access nodes 416, 422 can be within at least a portion of an overlapping coverage area 414 of access node 412 where each access node 416, 422 has a coverage area that includes a cell edge portion between the full strength coverage area 418, 424 and the edge of the cell coverage area 420, 426.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while three access nodes 412, 416, 422 are illustrated in FIG. 4, any number of access nodes can be implemented within system 400.

Access nodes 412, 416, 422 can comprise a processor and associated circuitry to execute or direct the execution of computer-readable instructions to obtain information. Access nodes 412, 416, 422 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 412, 416, 422 can receive instructions and other input at a user interface.

Gateway 428 can be any network node configured to interface with other network nodes using various protocols. Gateway 428 can communicate user data over system 400. Gateway 428 can be a standalone computing device, computing system, or network component, and can be accessible, for example, by a wired or wireless connection, or through an indirect connection such as through a computer network or communication network. For example, gateway 428 can include a serving gateway (SGW) and/or a public data network gateway (PGW), etc. One of ordinary skill in the art would recognize that gateway 428 is not limited to any specific technology architecture, such as Long Term Evolution (LTE) and can be used with any network architecture and/or protocol.

Gateway 428 can comprise a processor and associated circuitry to execute or direct the execution of computer-readable instructions to obtain information. Gateway 428 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 428 can receive instructions and other input at a user interface.

Controller node 430 can be any network node configured to communicate information and/or control information over system 400. Controller node 430 can be configured to transmit control information associated with a handover procedure. Controller node 430 can be a standalone computing device, computing system, or network component, and can be accessible, for example, by a wired or wireless connection, or through an indirect connection such as through a computer network or communication network. For example, controller node 430 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 430 is not limited to any specific technology architecture, such as Long Term Evolution (LTE) and can be used with any network architecture and/or protocol.

Controller node 430 can comprise a processor and associated circuitry to execute or direct the execution of computer-readable instructions to obtain information. Controller node 430 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 430 can receive instructions and other input at a user interface.

Access node 412 can be in communication with access node 416 through communication link 434. Access node 412 can be in communication with access node 422 through communication link 436. Access node 422 can be in communication with gateway 428 through communication link 438. Access node 412 can be in communication with gateway 428 through communication link 440. Access node 416 can be in communication with gateway 428 through communication link 442. Access node 422 can be in communication with controller node 430 through communication link 444. Access node 412 can be in communication with controller node 430 through communication link 446. Access node 416 can be in communication with controller node 430 through communication link 448. Gateway 428 can be in communication with controller node 430 through communication link 450 and with communication network 432 through communication link 452. Communication links 434, 436, 438, 440, 442, 444, 446, 448, 450, 452 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 434, 436, 438, 440, 442, 444, 446, 448, 450, 452 can be a direct link or might include various equipment, intermediate components, systems, and networks.

Communication network 432 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 432 can be capable of carrying data, for example, to support voice, push-to-talk, broadcast video, and data communications by a wireless device such as wireless device 402. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 432 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 432 can also comprise additional base stations, controller nodes, telephony switches, internet routers, network gateways, computer systems, communication links, or some other type of communication equipment, and combinations thereof.

In operation, a network node such as access node 412 and/or controller node 430 can determine a scheduling scheme based on data addressed to wireless devices 410 in communication with access node 412, data addressed to wireless devices 402, 404 in communication with access node 416, and data addressed to wireless devices 406, 408 in communication with access node 422. The scheduling scheme can comprise a first subframe and a second subframe. The scheduling scheme can be communicated from access node 412 and/or controller node 430 to access nodes 416, 422. Each access node 416, 422 can determine whether the data addressed to wireless devices that meet a signal condition threshold (e.g. the wireless devices within the cell edge of access nodes 416, 422) exceeds an allocation threshold. When the data addressed to wireless devices that meet the signal condition threshold exceeds the allocation threshold, access node 412 can instruct the access nodes 416, 422 to modify allocation of data addressed to at least one wireless device that meets the signal condition threshold. Alternatively, access node 412 can instruct the access nodes 416, 422 to initiate a handover procedure to access node 412. Then data addressed to the wireless devices in communication with access node 412 can be transmitted during the first subframe of the scheduling scheme where access node 412 does not transmit data addressed to the wireless devices 410 during the second subframe of the scheduling scheme. Access nodes 416, 422 can then be instructed to assign data addressed to wireless devices that do not meet a signal condition threshold 402, 406 to be transmitted during the first subframe of the scheduling scheme and to assign data addressed to wireless devices that meet the signal condition threshold 404, 408 to be transmitted during the second subframe of the scheduling scheme.

Figure 5:
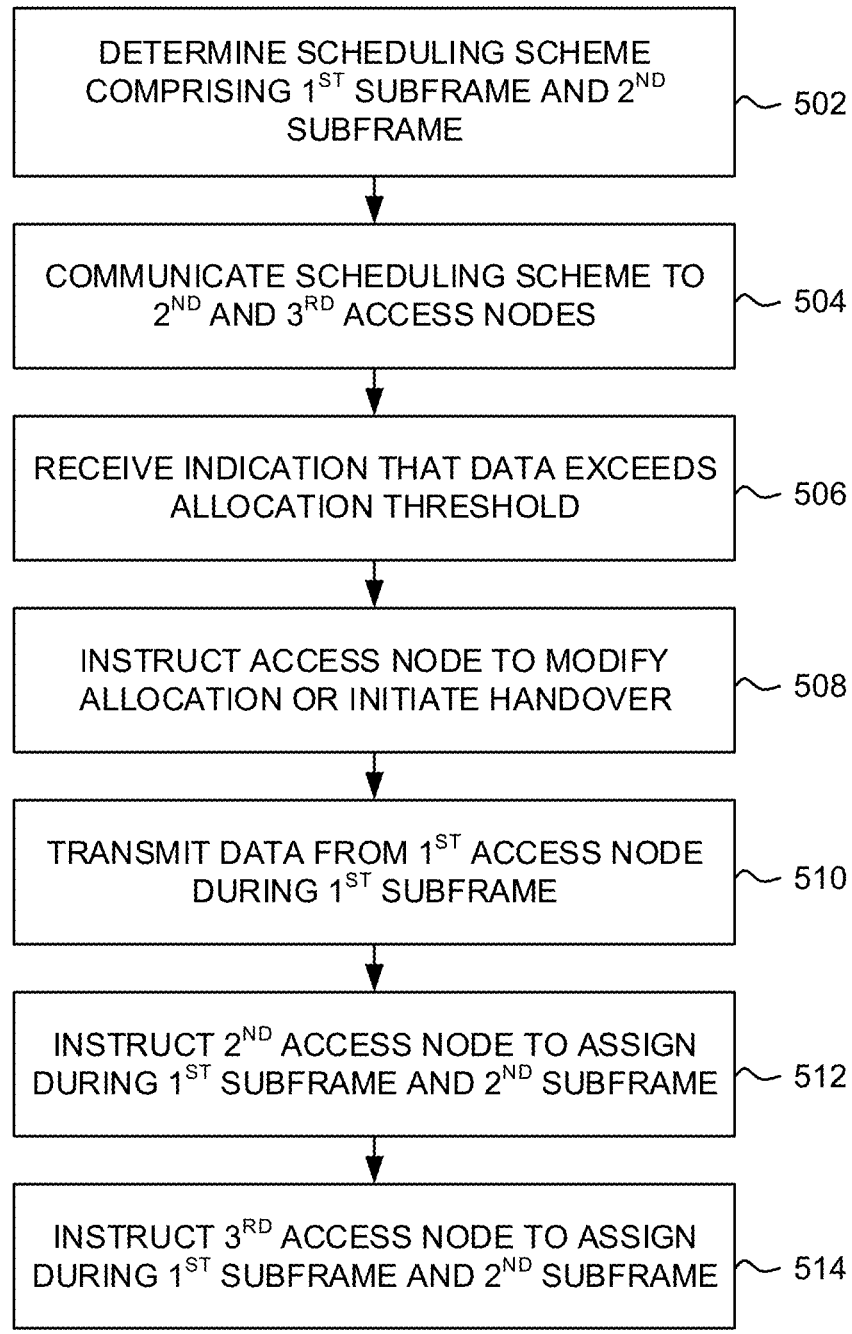
FIG. 5 illustrates another exemplary method of scheduling communication in a wireless communication network.

FIG. 5 illustrates a flow chart of an exemplary method of scheduling communication in a wireless communication network. The method will be discussed with reference to the exemplary communication system 400 illustrated in FIG. 4. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 502, a network node can determine a scheduling scheme comprising a first subframe and a second subframe. For example, access node 412 or controller node 430 can determine the scheduling scheme. A scheduling scheme can be any scheme associated with scheduling resources for an access node to be in communication with a wireless device. A scheduling scheme can comprise a plurality of frames and each frame can comprise a plurality of subframes where the plurality of subframes comprises at least one first subframe and at least one second subframe. The number of first subframes and second subframes determined within the scheduling scheme can be based on various factors such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul of system 400, a throughput of each network node, a processing load at each network node, and any delay associated with each network node.

In an exemplary embodiment, the scheduling scheme can be further determined based on a signal condition of wireless devices in communication with access nodes 402, 404, 406, 408, 410. For example, wireless devices in communication with access nodes 416, 422 can experience interference from access node 412 if they are located in the cell edge of access nodes 416, 422. Therefore, a signal condition of the wireless devices 402, 404, 406, 408, 410 in communication with access nodes 412, 416, 422 can be determined prior to determining the scheduling scheme. The signal condition can be indicative of a signal quality and/or signal strength and be based on a signal characteristic. For example, the signal condition can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR).

After the signal characteristic associated with each wireless device is classified as meeting the signal condition (e.g. the wireless device is located at the cell edge of the associated access node) and not meeting the signal condition (e.g. the wireless device is not located at the cell edge of the associated access node), the network node can determine the scheduling scheme. In an exemplary embodiment, when data addressed to a wireless device, such as wireless devices 402, 404, 406, 408, 410, exceeds a threshold amount and the wireless device is determined to be located at the cell edge of the associated access node, the scheduling scheme associated with access node 412 can comprise a greater number of almost blank subframes.

The scheduling scheme can be communicated to a second and third access node at 504. For example, after controller node 430 and/or access node 412 determines the scheduling scheme for access nodes 412, 416, 422 to communicate with wireless devices 402, 404, 406, 408, 410, respectively, the scheduling scheme is communicated to access nodes 416, 422.

The second and/or third access node can compare the scheduling scheme to the amount of data addressed to the wireless devices in communication with the second and/or third access node to be allocated. When the amount of data addressed to wireless devices that meet the signal condition threshold (e.g. the wireless devices are in the cell edge of the access node coverage area) exceeds the number of subframes assigned in the scheduling scheme, the second and/or third access node can send and the network node can receive an indication that data addressed to the wireless devices that meet the signal condition threshold exceeds an allocation threshold at 506. For example, access node 416 can determine that the data addressed to wireless device 404 exceeds the allocation threshold because the amount of data addressed to wireless device 404 cannot be fully allocated during the second subframes of the scheduling scheme. Access node 416 can determine that the allocation threshold is exceeded based on various factors. For example, access node 416 can further determine whether applications running on each wireless device that meet the signal condition threshold. For instance, delay sensitive applications can be given higher data allocation priority than non-delay sensitive applications. Access node 416 can rank each wireless device 404 that meets the signal condition threshold based on an amount of data addressed to each wireless device, the modulation and coding scheme associated with each wireless device, an application running on each wireless device, a signal characteristic of each wireless device, etc. Access node 416 can then send a message to access node 412 and/or controller node 430 comprising an indication that data addressed to all wireless devices that meet the signal condition threshold exceeds the allocation threshold.

At 508, the network node can instruct the second access node and/or third access node to modify data allocation or initiate a handover of at least one wireless device. For example, access node 412 and/or controller node 430 can instruct access nodes 416 and/or 422 to modify how the data addressed to wireless devices 404, 408 that meet the signal condition threshold is allotted during the scheduling scheme or to initiate a handover of at least one wireless device 404, 408 to access node 412. In an exemplary embodiment, when an application running on a wireless device 404, 408 that meets the signal condition threshold is a non-delay sensitive application, access node 412 and/or controller node 430 can instruct access node 416 and/or 422 to delay allocation of data addressed to wireless devices 404, 408 until a subsequent frame. In another exemplary embodiment, when a time sensitive application is running on wireless devices 404, 408, access node 412 and/or controller node 430 can instruct access node 416 and/or 422 to initiate handing over any number of wireless devices to access node 412 until the data addressed to wireless devices 404, 408 is reduced below the allocation threshold. Alternatively, access node 412 and/or controller node 430 can instruct access node 416 and/or 422 to initiate handing over any number of wireless devices until the amount of data addressed to wireless devices that meet the signal condition threshold is reduced below the allocation threshold.

The first access node can transmit data during the first subframe of the scheduling scheme at 510. For example, access node 412 can transmit data addressed to wireless devices 410 during the first subframe of the scheduling scheme and not transmit data addressed to wireless devices 410 during the second subframe of the scheduling scheme.

The second access node can be instructed to assign data addressed to wireless devices in communication with the second access node that do not meet a signal condition threshold to be transmitted during the first subframe and to assign data addressed to wireless devices that meet the signal condition threshold to be transmitted during the second subframe of the scheduling scheme at 512. For example, access node 412 and/or controller node 430 can instruct access node 416 to transmit data addressed to wireless devices at the cell edge 404 during the second subframe (e.g. when access node 412 is not transmitting data to wireless devices 410) and to transmit data addressed to wireless devices not at the cell edge 402 during the first subframe of the scheduling scheme (e.g. when access node 412 is transmitting data to wireless devices 410).

At 514, the third access node can be instructed to assign data addressed to wireless devices in communication with the third access node that do not meet the signal condition threshold to be transmitted during the first subframe and to assign data addressed to wireless devices that meet the signal condition threshold to be transmitted during the second subframe of the scheduling scheme. For example, access node 412 and/or controller node 430 can instruct access node 422 to transmit data addressed to wireless devices at the cell edge during the second subframe and to transmit data addressed to wireless devices not at the cell edge during the first subframe of the scheduling scheme.

Figure 6:
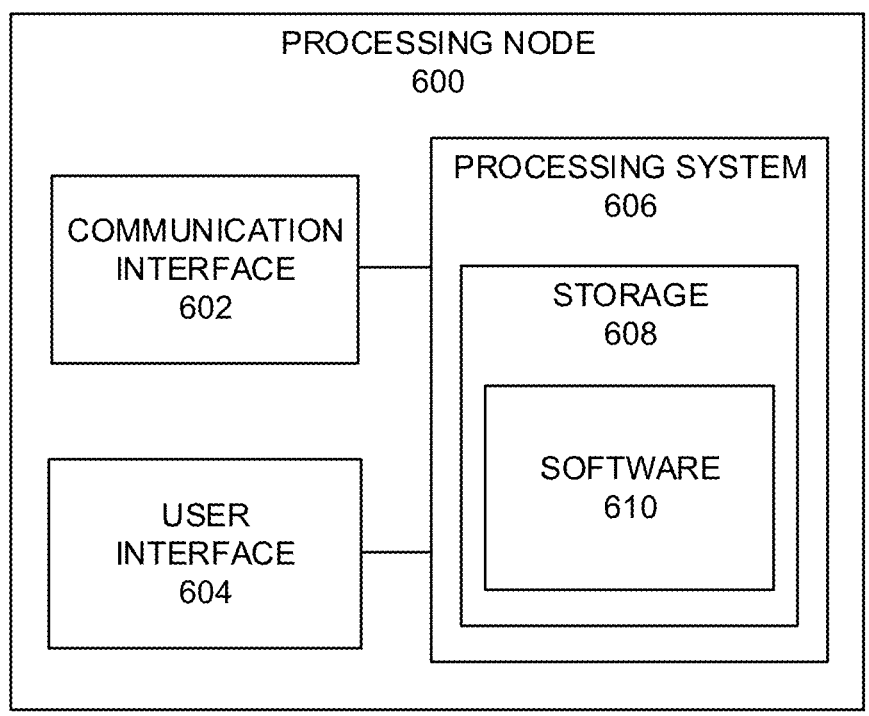
FIG. 6 illustrates a processing node according to an exemplary embodiment.

FIG. 6 illustrates an exemplary processing node 600 in a communication system. Processing node 600 comprises communication interface 602, user interface 604, and processing system 606 in communication with communication interface 602 and user interface 604. Processing node 600 is capable of monitoring communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 114, 116, 118, 412, 416, 422, controller nodes 120, 430, and gateway 428. Processing node 600 can also be an adjunct or component of a network element, such as an element of access nodes 114, 116, 118, 412, 416, 422, controller nodes 120, 430, and gateway 428. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling communication in a wireless communication network, comprising:

determining at a first access node a scheduling scheme based on data addressed to wireless devices in communication with the first access node, data addressed to wireless devices in communication with a second access node, and data addressed to wireless devices in communication with a third access node, wherein the scheduling scheme comprises a first subframe and a second subframe;

communicating the scheduling scheme from the first access node to the second access node and the third access node;

transmitting the data addressed to the wireless devices in communication with the first access node during the first subframe of the scheduling scheme, wherein the first access node does not transmit data addressed to the wireless devices in communication with the first access node during the second subframe of the scheduling scheme;

instructing the second access node to assign data addressed to wireless devices in communication with the second access node that do not meet a signal condition threshold to be transmitted during the first subframe of the scheduling scheme and to assign data addressed to wireless devices in communication with the second access node that meet the signal condition threshold to be transmitted during the second subframe of the scheduling scheme, the signal condition threshold being met by wireless devices within a cell edge of one of the second and third access nodes;

instructing the third access node to assign data addressed to wireless devices in communication with the third access node that do not meet the signal condition threshold to be transmitted during the first subframe of the scheduling scheme and to assign data addressed to wireless devices in communication with the third access node that meet the signal condition threshold to be transmitted during the second subframe of the scheduling scheme; and receiving, at the first access node, an indication from the second access node that the data addressed to at least one wireless device that meets the signal condition threshold cannot be fully allocated during the second subframe;

wherein the indication is based on an application requirement of an application running on said at least one wireless device.

2. The method of claim 1, further comprising:
instructing the second access node to modify allocation of data addressed to said at least one wireless device that meets the signal condition threshold, wherein the modification results in data addressed to said at least one wireless device that is fully allocated during the second subframe.

3. The method of claim 1, further comprising:
instructing the second access node to initiate a handover procedure from the second access node to the first access node of said at least one wireless device that meets the signal condition threshold.

4. The method of claim 1, wherein the scheduling scheme comprises a plurality of first subframes and second subframes and a number of the second subframes is based on the data addressed to wireless devices in communication with the first access node, the data addressed to wireless devices in communication with a second access node, the data addressed to wireless devices in communication with a third access node, an application requirement of at least one wireless device in communication with the second access node that meets the signal condition threshold, and an application requirement of at least one wireless device in communication with the third access node that meets the signal condition threshold.

5. The method of claim 4, wherein the number of the second subframes is further based on a load at the second access node, a load at the third access node, a signal characteristic of wireless devices in communication with the second access node, and a signal characteristic of wireless devices in communication with the third access node.

6. The method of claim 1, wherein the wireless devices that meet the signal condition threshold are determined to be in a cell edge region of a respective access node.

7. The method of claim 1, wherein the first access node comprises a macro access node and the second access node and the third access node comprise at least one of a micro access node, a pico access node, and a femto access node.

8. A system of scheduling communication in a wireless communication network, comprising:
a processing node configured to
determine a scheduling scheme based on data addressed to wireless devices in communication with a first access node, data addressed to wireless devices in communication with a second access node, and data addressed to wireless devices in communication with a third access node, wherein the scheduling scheme comprises a first subframe and a second subframe,
communicate the scheduling scheme from the first access node to the second access node and the third access node,
transmit the data addressed to the wireless devices in communication with the first access node during the first subframe of the scheduling scheme, wherein the first access node does not transmit data addressed to the wireless devices in communication with the first access node during the second subframe of the scheduling scheme,
instruct the second access node to assign data addressed to wireless devices in communication with the second access node that do not meet a signal condition threshold to be transmitted during the first subframe of the scheduling scheme and to assign data addressed to wireless devices in communication with the second access node that meet the signal condition threshold to be transmitted during the second subframe of the scheduling scheme, the signal condition threshold being met by wireless devices within a cell edge of one of the second and third access nodes;
instruct the third access node to assign data addressed to wireless devices in communication with the third access node that do not meet the signal condition threshold to be transmitted during the first subframe of the scheduling scheme and to assign data addressed to wireless devices in communication with the third access node that meet the signal condition threshold to be transmitted during the second subframe of the scheduling scheme; and
receive, at the first access node, an indication from the second access node that the data addressed to at least one wireless device that meets the signal condition threshold cannot be fully allocated during the second subframe;
wherein the indication is based on an application requirement of an application running on said at least one wireless device.

9. The system of claim 8, wherein the processing node is further configured to:
instruct the second access node to modify allocation of data addressed to said at least one wireless device that meets the signal condition threshold, wherein the modification results in data addressed to said at least one wireless device that is fully allocated during the second subframe.

10. The system of claim 8, wherein the processing node is further configured to:
instruct the second access node to initiate a handover procedure from the second access node to the first access node of said at least one wireless device that meets the signal condition threshold.

11. The system of claim 8, wherein the scheduling scheme comprises a plurality of first subframes and second subframes and a number of the second subframes is based on the data addressed to wireless devices in communication with the first access node, the data addressed to wireless devices in communication with a second access node, the data addressed to wireless devices in communication with a third access node, an application requirement of at least one wireless device in communication with the second access node that meets the signal condition threshold, and an application requirement of at least one wireless device in communication with the third access node that meets the signal condition threshold.

12. The system of claim 11, wherein the number of the second subframes is further based on a load at the second access node, a load at the third access node, a signal characteristic of wireless devices in communication with the second access node, and a signal characteristic of wireless devices in communication with the third access node.

13. The system of claim 8, wherein the wireless devices that meet the signal condition threshold are determined to be in a cell edge region of a respective access node.

14. The system of claim 8, wherein the first access node comprises a macro access node and the second access node and the third access node comprise at least one of a micro access node, a pico access node, and a femto access node.

* * * * *